United States Patent
Ruhmann et al.

(10) Patent No.: US 10,954,986 B2
(45) Date of Patent: Mar. 23, 2021

(54) SCREW FASTENERS FOR FIBROUS MATERIALS

(71) Applicant: 1833236 Ontario Inc., Thunder Bay (CA)

(72) Inventors: Swen Kai Ruhmann, Kakabeka Falls (CA); Ulrich O. H. Walther, Thunder Bay (CA)

(73) Assignee: 1833236 Ontario Inc., Thunder Bay (CA)

( * ) Notice: Subject to any disclaimer, the term of this patent is extended or adjusted under 35 U.S.C. 154(b) by 282 days.

(21) Appl. No.: 15/928,778

(22) Filed: Mar. 22, 2018

(65) Prior Publication Data

US 2019/0093691 A1    Mar. 28, 2019

(51) Int. Cl.
*F16B 25/08* (2006.01)
*F16B 25/00* (2006.01)
*F16B 25/10* (2006.01)
*F16B 33/02* (2006.01)

(52) U.S. Cl.
CPC ...... *F16B 25/0063* (2013.01); *F16B 25/0015* (2013.01); *F16B 25/0052* (2013.01); *F16B 25/0073* (2013.01); *F16B 25/0078* (2013.01); *F16B 25/103* (2013.01); *F16B 25/106* (2013.01); *F16B 2033/025* (2013.01)

(58) Field of Classification Search
CPC ............. F16B 25/0015; F16B 25/0052; F16B 25/0057; F16B 25/0068; F16B 25/0078; F16B 25/0063
USPC ................ 411/386, 387.2, 412–413
See application file for complete search history.

(56) References Cited

U.S. PATENT DOCUMENTS

| | | | | |
|---|---|---|---|---|
| 3,079,968 A * | 3/1963 | Buckley | ............. | F16B 25/0052 411/304 |
| 4,323,326 A * | 4/1982 | Okada | ................ | F16B 25/0021 411/311 |
| 7,402,016 B2 * | 7/2008 | Yin-Feng | ............. | F16B 5/0275 411/387.2 |
| 7,677,854 B2 * | 3/2010 | Langewiesche | ........ | F16B 25/00 411/387.2 |
| 7,862,279 B2 * | 1/2011 | Stiebitz | ................ | F16B 35/041 411/387.1 |
| 9,163,654 B2 * | 10/2015 | Barenski, Jr. | ....... | F16B 25/0047 |
| 9,322,422 B2 * | 4/2016 | Park | .................... | F16B 25/0015 |
| 9,651,079 B2 * | 5/2017 | Park | .................... | F16B 25/0015 |

(Continued)

*Primary Examiner* — Flemming Saether
(74) *Attorney, Agent, or Firm* — Kyle R Satterthwaite; Michael R Williams; Ade & Company Inc.

(57) ABSTRACT

A screw fastener particularly adapted to improve retention while minimizing mushrooming in fibrous workpieces. A single-threaded lower portion neighbours the pointed tip of the screw and a dual-threaded upper portion neighbours the screw head. The upper portion has a first upper thread that spirals in an opposite direction to the singular lower thread, and a second upper thread that spirals in a same direction as the singular lower thread. The lower thread includes a plurality of thread turns that share a same major thread diameter while axially spanning multiple areas of the lower portion of the shaft that vary in diameter, including a bulged area, a reduced upper area of lesser shaft diameter than the bulged area at a location between the bulged area and the head, and a downwardly tapered lower area at which the diameter of the shaft narrows from the bulged area toward the pointed tip.

23 Claims, 2 Drawing Sheets

(56) References Cited

U.S. PATENT DOCUMENTS

| | | | |
|---|---|---|---|
| 2009/0097942 A1* | 4/2009 | Weiss | F16B 25/0031 411/403 |
| 2016/0186794 A1* | 6/2016 | Belinda | F16B 25/0015 411/387.1 |
| 2017/0108026 A1* | 4/2017 | Yang | F16B 25/103 |

* cited by examiner

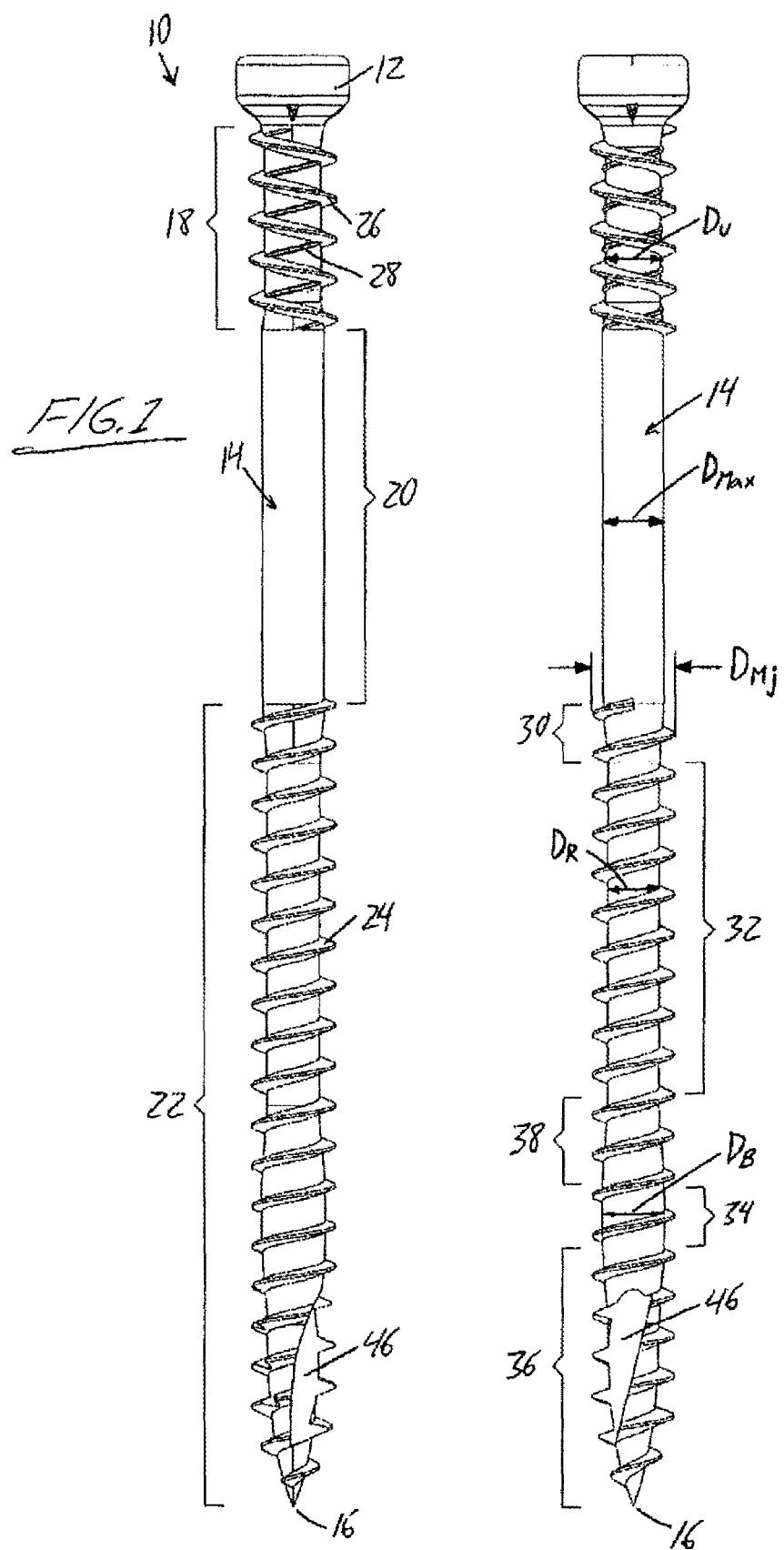

SCREW FASTENERS FOR FIBROUS MATERIALS

CROSS-REFERENCE TO RELATED APPLICATIONS

This application claims benefit under 35 U.S.C. 119(a) of Canadian Patent Application No. 2,979,899, filed Sep. 22, 2017, the entirety of which is incorporated herein by reference.

FIELD OF THE INVENTION

The present invention relates generally to screw fasteners, and more particularly to improved screw fasteners particularly useful for composite lumber or other fibrous workpieces.

BACKGROUND

Composite lumber has recently become a more commonly employed material for building decks and other outdoor structures. Modern composite lumber is typically of a capped design, and employs such a wood/polymer blend as the main core of the lumber, to which a covering cap or skin is bonded during manufacture to provide an external shell that better protects the core from the elements. The composite construction employed in such products can provide numerous benefits, including improved dimensional stability, and notable insect, moisture and rot resistance to provide increased lifespan with minimal maintenance requirements.

However, erecting structures using such capped composite building materials is not without its shortcomings, particularly in relation to fastening thereof with conventional deck screws. Known problems include "mushrooming", where fibrous core material augured upwardly within the bore created by the screw causes the covering cap or skin to bulge upwardly, leaving an unsightly bump in the otherwise flat surface of the composite lumber. Other known issues include cracking or splitting of the core around the screw bore, and poorer screw retention compared to solid wood lumber.

Several specialized screw designs have been proposed in the prior art to overcome such issues, including screws whose shafts have distinctly threaded sections of different left and right hand pitch, as seen in US2007/0128001, U.S. Pat. Nos. 8,894,339 and 9,624,961; screws whose shafts have distinctly threaded sections of same pitch direction but different pitch angle, as seen in U.S. Pat. No. 7,367,768; and screws with a singular thread spanning an entirety or majority of the shaft and featuring ribs of opposite pitch direction to the thread between adjacent turns of the thread, as seen in US2007/0286701, US2013/0011214 and US2017/0045075.

Other examples of screws particularly designed for use with composite materials include those disclosed in US20080031705, U.S. Pat. Nos. 7,037,059, 7,255,523 and 9,624,961.

However, none of the forgoing references in the prior art teach or suggest the novel screw designs herein with unique feature combinations intended to address the complications faced in screwed assembly of composite lumber and other similar fibrous core products.

SUMMARY OF THE INVENTION

According to a first aspect of the invention, there is provided a screw fastener comprising:

a head; and
a shaft extending axially from the head, said shaft having a head end affixed to the head and an axially opposing free end defining a pointed tip;
said shaft having a threaded lower portion in which a lower thread spirals around the shaft toward the pointed tip, said lower thread including a plurality of thread turns that share a same major thread diameter while axially spanning multiple areas of the lower portion of the shaft that vary in shaft diameter from one another to create different minor thread diameters and different thread depths among said plurality of thread turns;
said multiple areas of the lower portion of the shaft including a bulged area, a reduced upper area of lesser shaft diameter than the bulged area at a location between the bulged area and the head, and a downwardly tapered lower area at which the diameter of the shaft narrows from the bulged area toward the pointed tip.

Preferably, said multiple areas of the shaft include an upwardly tapered area at which the diameter of the shaft narrows from the bulged area toward the head.

Preferably, said downwardly tapered lower area comprises differently tapered regions, including an upper region that resides adjacent the bulged area and tapers at a steeper angle than a neighbouring intermediate region that continues from said upper region toward the pointed tip.

Preferably, the shaft comprises an unthreaded portion disposed between the threaded lower portion and the head, the shaft being of greater diameter at said unthreaded portion than at all of the multiple areas of the threaded lower portion of the shaft.

Preferably, the multiple areas of the lower portion of the shaft comprise a tapered upper end narrowing from the unthreaded portion of the shaft.

Preferably, the shaft comprises an upper threaded portion disposed between the unthreaded portion and the head, said upper threaded portion having at least a first upper thread defined thereon.

Preferably, said first upper thread spirals around the shaft in a direction opposite the lower thread.

Preferably, the threaded upper portion comprises a second upper thread that spirals around the shaft in an opposite direction to the first upper thread.

Preferably, the second upper thread is of lesser major diameter than the first upper thread.

Preferably, the second upper thread is a segmented thread and the first upper thread is a continuous thread that interrupts the second upper thread between adjacent segments thereof.

Preferably, in addition to the plurality of thread turns that share the same major thread diameter, the lower thread further comprise one or more additional turns that continue from said plurality of thread turns toward the pointed tip and gradually reduce in major diameter theretoward.

Preferably, a longitudinal cutting groove is recessed into the shaft and extending upwardly therealong toward the head through part of the lower thread from near the pointed tip, said cutting groove stopping short of an upper end of the bulged area of the shaft.

Preferably, an entirety of the cutting groove resides below the bulged area, and thus stops entirety short thereof.

Preferably, one or more turns of the lower thread situated below the bulged area of the shaft include one or cutting notches recessed into a crest of the thread.

Preferably, said one or more notches comprise a plurality of cutting notches provided in multiple turns of the lower thread in a quantity of one notch per turn, and said plurality of cutting notches are angularly offset from one another around the shaft toward the pointed tip in a direction opposite a pitch direction of the lower thread.

According to a second aspect of the invention, there is provided a screw fastener comprising:

a head;

a shaft extending axially from the head, said shaft having a head end affixed to the head and an axially opposing free end defining a pointed tip;

said shaft having a single-threaded lower portion and a dual-threaded upper portion;

said single-threaded lower portion having a singular thread that spirals around the shaft in a first direction;

said dual-threaded upper portion, of any and all threaded portions of the shaft, being situated closest to the head end of the shaft, and having a first upper thread that spirals around the shaft in an opposite direction to the singular lower thread and a second upper thread that spirals around the shaft in a same direction as the singular lower thread.

Preferably, the singular thread of the lower portion includes a plurality of thread turns that share a same major thread diameter while axially spanning multiple areas of the lower portion of the shaft that vary in shaft diameter from one another to create different minor thread diameters and different thread depths among said plurality of thread turns, said multiple areas of the lower portion of the shaft including a bulged area, a reduced upper area of lesser shaft diameter than the bulged area at a location between the bulged area and the head, and a downwardly tapered lower area at which the diameter of the shaft narrows from the bulged area toward the pointed tip Preferably, said multiple areas of the lower portion of the shaft include an upwardly tapered area at which the diameter of the shaft narrows from the bulged area toward the head.

Preferably, said multiple areas of the lower portion of the shaft include a reduced upper area of lesser shaft diameter than the bulged area at a location between the bulged area and the head.

Preferably, the shaft comprises an unthreaded shank portion disposed between the threaded lower portion and the dual-threaded upper portion, the shaft being of greater diameter at said unthreaded shank portion than at all of the multiple areas in the threaded lower portion.

Preferably, the multiples areas of the lower portion shaft comprise a tapered upper end of the lower portion that narrows from the unthreaded portion of the shaft.

Preferably, in addition to the plurality of thread turns that share the same major thread diameter, the lower thread further comprise one or more additional turns that continue from said plurality of thread turns toward the pointed tip and gradually reduce in major diameter theretoward.

Preferably, a longitudinal cutting groove is recessed into the shaft and extending upwardly therealong toward the head through part of the lower thread from near the pointed tip, said cutting groove stopping short of an upper end of the bulged area of the shaft.

Preferably, an entirety of the cutting groove resides below the bulged area, and thus stops entirety short thereof.

Preferably, one or more turns of the lower thread situated below the bulged area of the shaft include one or cutting notches recessed into a crest of the thread.

Preferably, said one or more notches comprise a plurality of cutting notches provided in multiple turns of the lower thread in a quantity of one notch per turn, and said plurality of cutting notches are circumferentially offset from one another around the shaft toward the pointed tip in a direction opposite a pitch direction of the lower thread.

BRIEF DESCRIPTION OF THE DRAWINGS

One embodiment of the invention will now be described in conjunction with the accompanying drawings in which:

FIG. 1 is a front elevational view of a screw fastener according to a preferred embodiment of the present invention.

FIG. 2 is a side elevational view of the screw fastener of FIG. 1.

DETAILED DESCRIPTION

Figure 3:
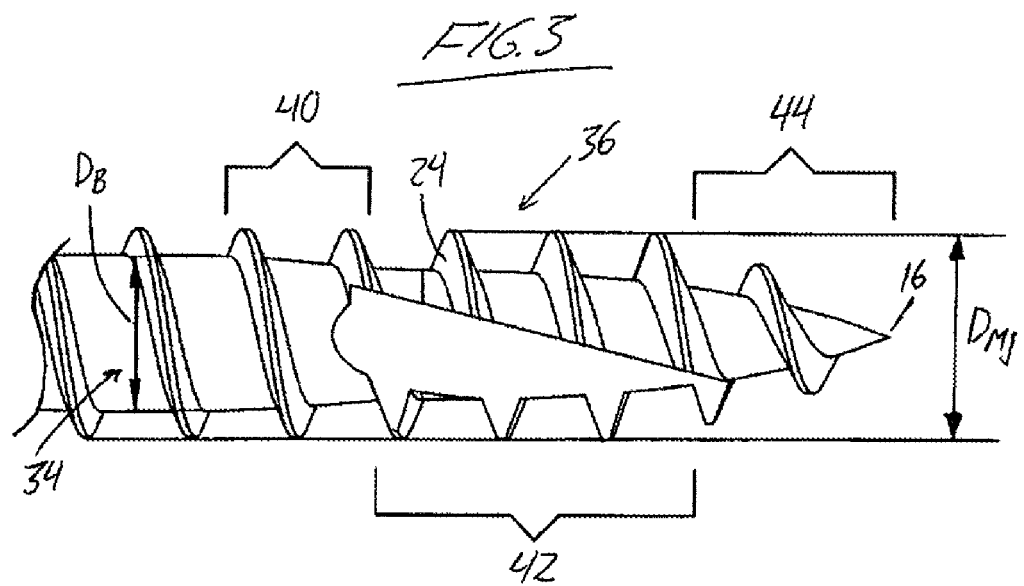
FIG. 3 is a partial closeup of the screw fastener of FIG. 2.
Figure 4:
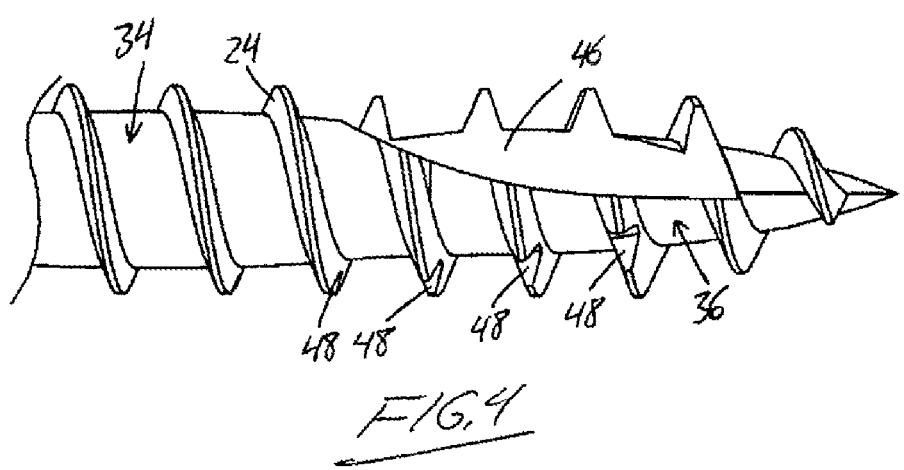
FIG. 4 is a partial closeup of the screw fastener of FIG. 1.

The drawings illustrate a screw fastener according to a preferred embodiment of the present invention. In normal fashion, the screw fastener 10 features a drive head 12 at one end, and an elongated shaft 14 extending axially downward from the drive head 12. The shaft 14 features a head end rigidly affixed to the drive head 12, and an opposite free end at which the shaft terminates in a pointed tip 16. The uniquely configured shaft features a dual-threaded upper portion 18 situated at the head end of the shaft and spanning a fractional portion of the shaft's axial length down to an unthreaded central portion 20, which then spans another fractional portion of the shaft's axial length down to a final single-threaded lower portion 22 that spans the remaining fractional portion of the shaft's axial length down to the pointed tip 16. These three portions collectively define the entirety of the shaft's axial length from the head 12 down to the pointed tip 16.

The single-threaded lower portion 22 features a singular lower thread 24 that spirals around the shaft from the unthreaded central portion 20 down to the pointed tip 16 in a right-hand/clockwise direction. The dual-threaded upper portion 18 features first upper thread 26 that spirals around the shaft from the head end of the shaft to the unthreaded central portion in a left-hand/counter-clockwise direction opposite that of the singular lower thread 24. The dual-threaded upper portion 18 also features a second upper thread 28 that spirals around the shaft from the head end of the shaft down to the unthreaded central portion 20 in the same right-hand/clockwise direction as the singular lower thread 24. The second upper thread 28 is a segmented thread made up of a plurality of discrete segments each spanning a partial fraction of the shaft circumference between adjacent turns of the first upper thread 26. The first upper thread is an uninterrupted, continuous thread occupying a full helical path around the shaft and thus interrupting the second upper thread between adjacent segments thereof. The second upper thread 28 is of shallower thread depth than the first upper thread.

The unthreaded central section 20 of the shaft is a bare shank of cylindrical shape, and defines a maximum shaft diameter $D_{Max}$ of the screw, i.e. the area at which the shaft (excluding any and all threads thereon) is at its greatest. A lower end of the dual-threaded upper portion 18 is tapered to provide a gradually sloped transition from the maximum shaft diameter $D_{Max}$ at the unthreaded central portion 20 to a lesser shaft diameter spanning a substantial majority of the dual-threaded upper portion, which thus defines a main root diameter of both the first and second upper threads $D_U$. Similarly, an upper end of the single-threaded lower portion 22 is tapered to provide a gradually sloped transition from the maximum shaft diameter $D_{Max}$ at the unthreaded central portion 20 to a lesser shaft diameter in an upper half the single-threaded lower portion 22.

The single-threaded lower portion has more variability in its root diameter, as it is divided into different areas characterized by their different shaft diameters. Moving downwardly from the unthreaded central portion 20 toward the pointed tip 16, first there's the tapered upper end 30 of the lower portion 22 at which the shaft diameter reduces from the maximum shaft diameter $D_{Max}$ at the unthreaded central portion 20 to a reduced upper area 32 of uniform shaft diameter $D_R$ less than that of the unthreaded central portion. Further down the shaft, a bulged area 34 features a larger shaft diameter $D_B$ than the reduced upper area 32, and a downwardly tapered lower area 36 then reaches downwardly from the bulged area and features a gradually reducing shaft diameter that tapers down to the pointed tip 16. An upwardly tapered area 38 joins together the bulged area 34 and the reduced upper area 32 to provide a gradual transition from the wider diameter $D_B$ of the bulged area 34 to the narrower diameter $D_R$ of the reduced upper area 32.

The tapered upper end 30, reduced upper area 32, upwardly tapered area 38, bulged area 34 and downwardly tapered lower area 36 thus collectively define the entirety of the single-threaded lower portion 22 of the shaft. The singular lower thread 24 spans the entirety of the single-threaded lower portion 22 of the shaft, and maintains a uniform major thread diameter (i.e. crest-to-crest diameter) over a notable majority of the overall axial length of the single-threaded lower portion 22. More specifically, the singular lower thread 24 maintains this uniform major thread diameter $D_{Mj}$ from the tapered upper end of the single-threaded lower portion, downwardly through the reduced upper area, upwardly tapered area and bulged area, and into the downwardly tapered lower area. Only at the downwardly tapered lower area 36 does the major diameter of the singular lower thread reduce as it approaches the pointed tip 16 of the screw fastener.

The shaft diameter $D_B$ at the bulged area 34 is greater than at the reduced upper area 32 of the single-threaded lower portion 22, but lesser than at the unthreaded central portion 20. The main root diameter $D_B$ at the dual-threaded upper portion 18 is lesser than the maximum shaft diameter $D_{Max}$ at the unthreaded central portion 20 and the root diameter $D_B$ at the bulged area 34 of the single-threaded lower portion 22. In the illustrated example, the main root diameter $D_U$ at the dual-threaded upper portion is greater than the root diameter $D_R$ at the reduced upper area of the single-threaded lower portion 22.

The downwardly tapered lower area 36 of the single-threaded lower portion has variably tapered regions of different taper angle. Starting from the bulged area's point of greatest shaft diameter $D_B$, an upper region 40 of the downwardly tapered area 36 first tapers at a relatively steep angle, before an adjacent intermediate region 42 of the downwardly tapered area tapers at a more subtle angle. A lower region 44 then transitions from the subtler taper angle of the intermediate region 42 back into a steeper angle of taper toward the pointed tip 16. The singular lower thread 24 maintains the same major diameter $D_{Mj}$ from the bulged area 34 through the steeply tapered upper region 40 and into the subtly tapered intermediate region 42, and then in the steeply tapered lower region 44, reduces in major diameter toward the pointed tip 16.

The singular lower thread 24 varies in minor diameter over its length to the changing shaft diameter, while uniformity in the thread's major diameter throughout the tapered upper end 30, reduced upper area 32, upwardly tapered area 38 and bulged area 34 and into the downwardly tapered lower area 36 creates variation in the thread depth of the singular lower thread 24. Moving upwardly from the pointed tip 16, the thread depth increases through the steeply tapered lower region 44 due to increase in the thread's major diameter at a greater rate than the thread's minor diameter (i.e. shaft diameter) through this region. Then, with the major diameter having reached it maximum at the more subtly tapered intermediate region 42, through which the minor diameter continues increasing, the thread depth reduces gradually through this intermediate region 42, and then reduces more sharply toward the bulged area 36 through the steeply tapered upper region 40 of the downwardly tapered lower area 36. Continuing upward from the bulged area 34 through the upwardly tapered area 38, the reduction in the lower thread's minor diameter increases the thread depth notably into the reduced upper area 32, where the major and minor diameters are each maintained in uniformity to maintain a consistent thread depth up to the tapered upper end 30 of the single-threaded lower portion 22.

A longitudinal cutting groove 46 is recessed into the singular lower thread 24 and the shaft 14 at the downwardly tapered lower area 36. The cutting groove 40 extends upwardly therealong from the steeply tapered lower region 44 to the steeply tapered upper region 40, but stops short of the bulged area 34. Turns of the singular lower thread 24 starting at or near the bulged area 34 and continuing downwardly into the tapered lower area 36 feature cutting notches 48 recessed into the crest of the thread. These notched turns of the singular lower thread may span from the steeply tapered upper region 40 through the subtly tapered intermediate region 42, with the remaining turns of reduced major diameter at the steeply tapered lower region 44 lacking any such cutting notches. The illustrated embodiment features one cutting notch 48 per turn of the lower thread 24, with the notches each being circumferentially offset around the shaft from one to the next in a direction opposite the pitch direction of the lower thread 24. That is, while the lower thread spirals helically around in a right-hand/clockwise direction toward the pointed tip 16, the cutting notches are offset from one another in a counter-clockwise direction moving toward the pointed tip.

Having described the structure of the screw fastener, attention is now turned to its operation. During initial rotational driving of the screw fastener into a composite workpiece by the working bit or tip of a suitable driver engaged with the head 12, the pointed tip 16 and the shallow thread turns at the steeply tapered lower region 44 of the downwardly tapered lower area 36 drill into the fibrous core material of the workpiece through any cap or cover layer thereon to start a bore in the workpiece. Pulverized core material created by this initial drilling action is expelled through or trapped in the longitudinal cutting groove 36. The cutting notches 48 in the notched turns of the thread help cut fibres from the initially small-diameter opening of the bore formed by the narrow lower region 44 of the screw fastener's downwardly tapered lower area 36, whereby the notches help the deeper thread turns in which they are found cut into the walls of the initial small diameter bore. On continued driving the fastener into the workpiece, the bulged area 34 is then forced downwardly through the bore space that was just subjected to the notched thread turns of downwardly tapered lower area. The enlarged shaft diameter $D_B$ at the bulged area 34 pushes against the boundary walls of the bore, compressing the fibrous material of the workpiece's core, and thus enlarging the bore diameter. Together with the small shaft diameter at the reduced upper area 32 of the single-threaded lower portion 22, with bore enlargement action performed by the bulged area 34 better accommodates the cut fiber remnants in the space between the deeper thread turns at this reduced upper area 32 of the single-threaded lower portion 22. Additionally, the enlargement of the bore by the bulged area also reduces the friction experienced by the upper remainder of the screw as is driven downward through the enlarged bore space.

The left hand first upper thread 26 at the dual-threaded upper area helps prevent mushrooming, as fibers pushed upwardly through the workpiece bore by the right hand lower thread 24 at the single-threaded lower area 22 is forced back down the bore by the reverse spiral direction of the first upper thread 26. In the meantime, the mushroom prevention is further assisted by the shallower thread segments of the second upper thread 28, which help break up any large fibers entering the space between the turns of the first upper thread. Once the screw is driven fully into the workpiece, the compression of the bore walls performed by the passage of the bulged area through the bore is relieved, whereupon the fibrous material of the workpiece core will relax back into the available bore space between the deep turns of the lower thread at the reduced upper area 32 of the single-threaded lower portion, thus providing the screw fastener with significant holding strength. That is, the fibrous material of the composite work piece has a "memory" that will cause it to close back into momentarily expanded areas of the bore through which the bulged area 34 passed during travel to its final destination near the bottom of the workpiece bore.

In the illustrated embodiment, the first and second upper threads are of opposite pitch direction but equal pitch angle and have the same number of turns, and thus span equal axial distances along the shaft from the same starting point at the head end of the shaft to the same end point at the top end of the unthreaded central portion. However, the number of second thread segments between the continuous turns of the first thread and the relative pitch angle of these threads may vary within the scope of the present invention. In the illustrated embodiment, the major diameter of the first upper thread is the same as the uniform major diameter shared by the majority of turns in the singular lower thread. In the illustrated embodiment, the axial length of the single-threaded lower portion is exceeds the axial lengths of the dual-threaded upper portion and the unthreaded central portion, and the reduced upper area 32 has the greatest axial length among the different areas of the single-threaded lower portion, and a greater axial length than the dual-threaded upper portion. The enlarged shaft diameter $D_B$ at the bulged area is preferably 80-90% of the maximum shaft diameter. In one preferred embodiment, the enlarged shaft diameter $D_B$ at the bulged area is approximately 90% of the maximum shaft diameter $D_{Max}$ at the unthreaded central portion 22, while the narrower shaft diameter $D_R$ at the reduced upper area 32 of the single-threaded lower portion is approximately 80% of the maximum shaft diameter $D_{Max}$.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A screw fastener comprising:
   a head; and
   a shaft extending axially from the head, said shaft having a head end affixed to the head and an axially opposing free end defining a pointed tip;
   said shaft having a threaded lower portion in which a lower thread spirals around the shaft toward the pointed tip, said lower thread including a plurality of thread turns that share a same major thread diameter while axially spanning multiple areas of the lower portion of the shaft that are all of circular outer circumference, but vary in shaft diameter from one another to create different minor thread diameters and different thread depths among said plurality of thread turns;
   said multiple areas of the lower portion of the shaft including a bulged area, a reduced upper area of lesser shaft diameter than the bulged area at a location between the bulged area and the head, and a downwardly tapered lower area at which the diameter of the shaft narrows from the bulged area toward the pointed tip.

2. The fastener of claim 1 wherein said multiple areas of the shaft include an upwardly tapered area at which the diameter of the shaft narrows from the bulged area toward the head.

3. The fastener of claim 1 wherein said downwardly tapered lower area comprises differently tapered regions, including an upper region that resides adjacent the bulged area and tapers at a steeper angle than a neighbouring intermediate region that continues from said upper region toward the pointed tip.

4. The fastener of claim 1 wherein the shaft comprises an unthreaded portion disposed between the threaded lower portion and the head, the shaft being of greater diameter at said unthreaded portion than at all of the multiple areas of the threaded lower portion of the shaft.

5. The fastener of claim 4 wherein the multiple areas of the lower portion of the shaft comprise a tapered upper end narrowing from the unthreaded portion of the shaft.

6. The fastener of claim 4 wherein the shaft comprises an upper threaded portion disposed between the unthreaded portion and the head, said upper threaded portion having at least a first upper thread defined thereon.

7. The fastener of claim 6 wherein said first upper thread spirals around the shaft in a direction opposite the lower thread.

8. The fastener of claim 6 wherein the threaded upper portion comprises a second upper thread that spirals around the shaft in an opposite direction to the first upper thread.

9. The fastener of claim 8 wherein the second upper thread is of lesser major diameter than the first upper thread.

10. The fastener of claim 8 wherein the second upper thread is a segmented thread and the first upper thread is a continuous thread that interrupts the second upper thread between adjacent segments thereof.

11. The fastener of claim 1 wherein, in addition to the plurality of thread turns that share the same major thread diameter, the lower thread further comprise one or more additional turns that continue from said plurality of thread turns toward the pointed tip and gradually reduce in major diameter theretoward.

12. The fastener of claim 1 comprising a longitudinal cutting groove recessed into the shaft and extending upwardly therealong toward the head through part of the lower thread from near the pointed tip, said cutting groove stopping short of an upper end of the bulged area of the shaft.

13. The fastener of claim 12 wherein an entirety of the cutting groove resides below the bulged area, and thus stops entirety short thereof.

14. The fastener of claim 1 wherein one or more turns of the lower thread situated below the bulged area of the shaft include one or cutting notches recessed into a crest of the thread.

15. The fastener of claim 14 where said one or more notches comprise a plurality of cutting notches provided in multiple turns of the lower thread in a quantity of one notch per turn, and said plurality of cutting notches are angularly offset from one another around the shaft toward the pointed tip in a direction opposite a pitch direction of the lower thread.

16. A screw fastener comprising:
a head;
a shaft extending axially from the head, said shaft having a head end affixed to the head and an axially opposing free end defining a pointed tip;
said shaft having a single-threaded lower portion and a dual-threaded upper portion;
said single-threaded lower portion having a singular thread that spirals around the shaft in a first direction;
said dual-threaded upper portion, of any and all threaded portions of the shaft, being situated closest to the head end of the shaft, and having a first upper thread that spirals around the shaft in an opposite direction to the singular lower thread and a second upper thread that spirals around the shaft in a same direction as the singular lower thread;
wherein:
said first and second upper threads each spiral multiple times around a circumference of the shaft, and the second thread is a segmented thread comprising a plurality of segments that are each terminated at two opposing ends by the first upper thread; and
the first and second upper threads each have a respective starting end nearest to the head and a respective terminal end furthest from the head, and said respective starting ends reside at a same axial location on the shaft.

17. The screw fastener of claim 16 wherein the second upper thread is of lesser thread depth than the first upper thread.

18. The screw fastener of claim 16 the first upper thread is a continuous thread that interrupts the second upper thread between adjacent segments thereof.

19. The screw fastener of claim 16 wherein the second upper thread spans at least a majority of the axial length of the shaft spanned by the first upper thread.

20. The screw fastener of claim 16 wherein said respective terminal ends of the first and second upper threads reside at a same axial distance from the head.

21. A screw fastener comprising:
a head;
a shaft extending axially from the head, said shaft having a head end affixed to the head and an axially opposing free end defining a pointed tip;
said shaft having a single-threaded lower portion and a dual-threaded upper portion;
said single-threaded lower portion having a singular thread that spirals around the shaft in a first direction;
said dual-threaded upper portion, of any and all threaded portions of the shaft, being situated closest to the head end of the shaft, and having a first upper thread that spirals around the shaft in an opposite direction to the singular lower thread and a second upper thread that spirals around the shaft in a same direction as the singular lower thread
wherein:
said first and second upper threads each spiral multiple times around a circumference of the shaft, and the second thread is a segmented thread comprising a plurality of segments that are each terminated at two opposing ends by the first upper thread; and
the first and second upper threads make an equal number of turns around the shaft.

22. The screw fastener of claim 16 wherein the shaft comprises an unthreaded shank portion disposed between the single-threaded lower portion and the dual-threaded upper portion.

23. A screw fastener comprising:
a head; and
a shaft extending axially from the head, said shaft having a head end affixed to the head and an axially opposing free end defining a pointed tip;
said shaft having a threaded lower portion in which a lower thread spirals around the shaft toward the pointed tip, said lower thread including a plurality of thread turns that share a same major thread diameter while axially spanning multiple areas of the lower portion of the shaft that vary in shaft diameter from one another to create different minor thread diameters and different thread depths among said plurality of thread turns;
said multiple areas of the lower portion of the shaft including a bulged area, a reduced upper area of lesser shaft diameter than the bulged area at a location between the bulged area and the head, and a downwardly tapered lower area at which the diameter of the shaft narrows from the bulged area toward the pointed tip;
wherein said downwardly tapered lower area comprises differently tapered regions, including an upper region that resides adjacent the bulged area and tapers at a steeper angle than a neighbouring intermediate region that continues from said upper region toward the pointed tip.

* * * * *